United States Patent Office 3,043,150
Patented July 10, 1962

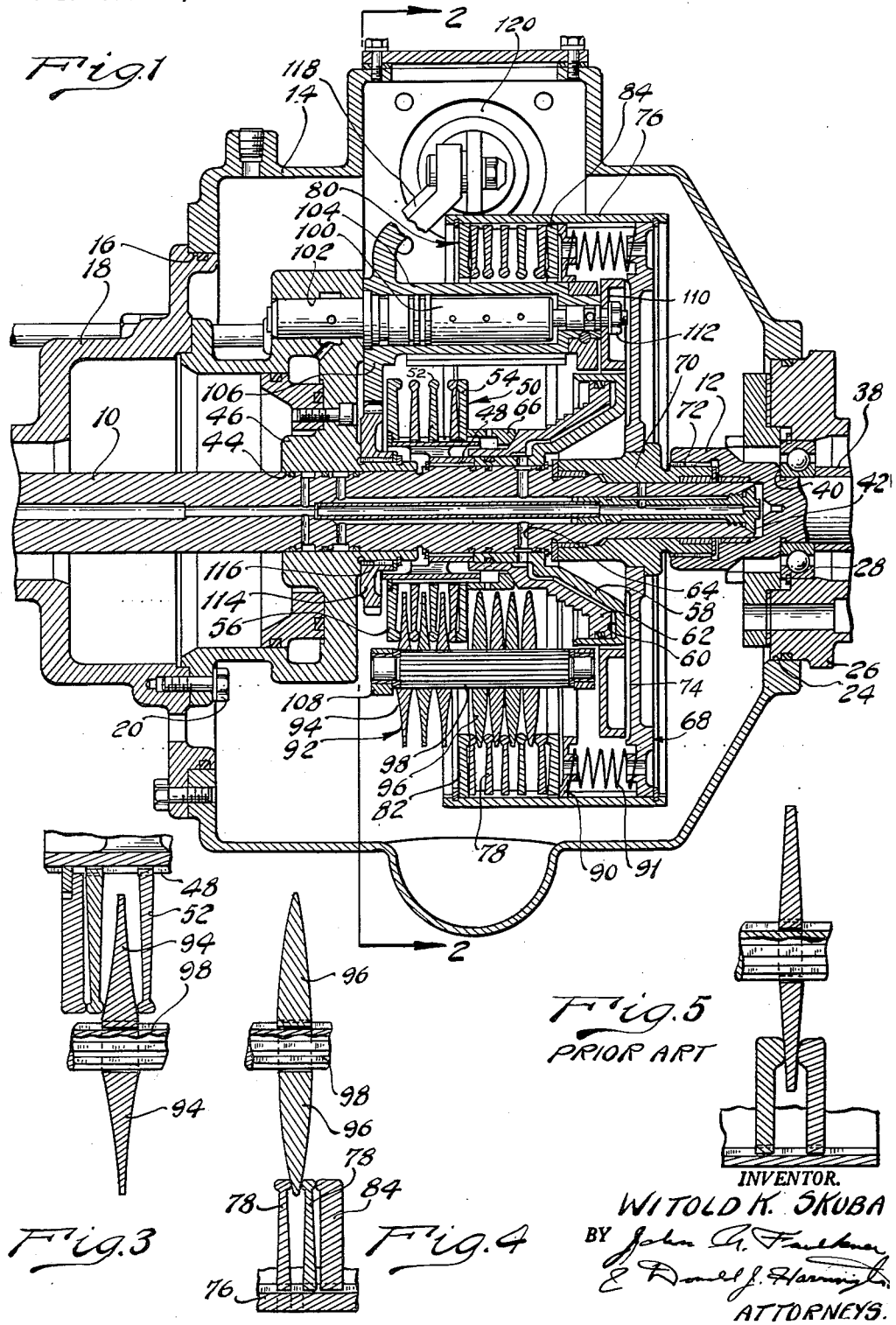

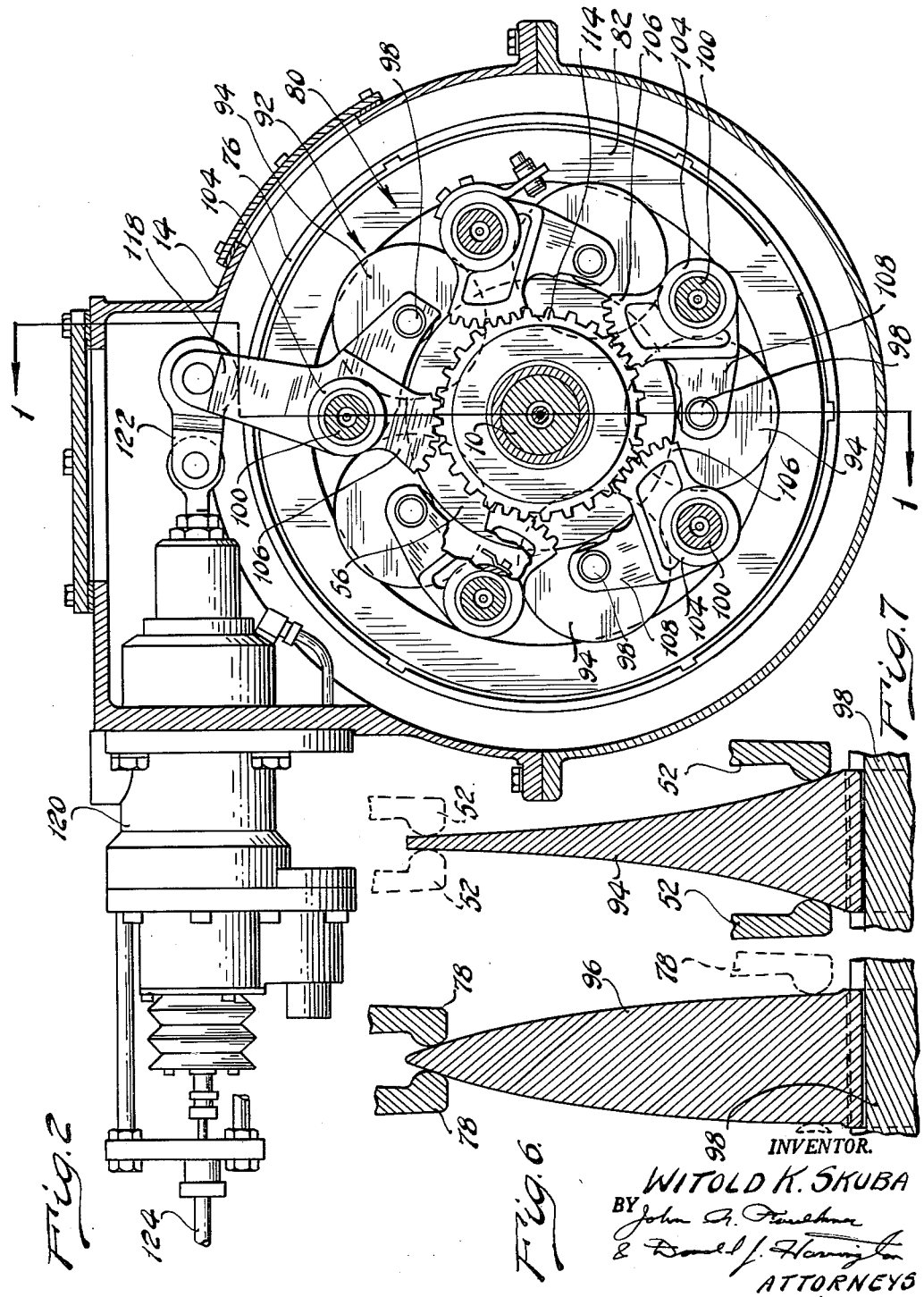

3,043,150
INFINITELY VARIABLE DISC DRIVE
Witold K. Skuba, Detroit, Mich., assignor to Ford Motor Company, Dearborn, Mich., a corporation of Delaware
Filed June 30, 1960, Ser. No. 40,019
4 Claims. (Cl. 74—199)

My invention relates generally to power transmission mechanisms, and more particularly to an infinitely variable power transmission mechanism of the friction disc type.

I am aware of various infinitely variable power transmission mechanisms having friction disc assemblies that drivably connect aligned power input and power output shafts. In one such mechanism the power input shaft has connected thereto an assembly of rimmed friction discs, and an assembly of ring discs is connected to the power output shaft.

Planet or carrier discs are situated between the power input discs and the power output ring discs, and they are situated in interdigital relationship with respect to the same. The ring discs and the power input discs each frictionally engage the planet discs so that a driving connection can be established between the power input discs and the ring discs.

An adjusting mechanism is provided for moving the planet discs radially inward or outward so that the driving speed ratio between the power input shaft and the power output shaft can be varied. When this is done, the radius of contact of the planet discs with the power input discs, measured from the axis of the planet discs, will vary from a minimum to a maximum as the speed ratio changes from a maximum value to a minimum value. Conversely, a corresponding change in the speed ratio will result in a decrease in the radius of contact of the planet discs with respect to the ring discs, as measured on the axis of the planet discs.

Provision may be made for applying the required clamping force to the cooperating discs so that a driving connection is established. Tangential friction forces are applied to the discs in this fashion. Similarly, suitable automatic or semi-automatic control means can be provided for varying the radial displacement of the planet discs.

In prior art arrangements of known construction, the planet discs are conical in form so that the radially inward region of each disc is thicker than the peripheral region. Because of this conical form, a relative curvature exists between the planet discs and the ring discs, and between the planet discs and the power input discs at the respective frictional contact regions. This relative curvature between the discs becomes greater as the region of the frictional contact is moved closer to the central axis of the planet discs.

In any particular installation, it is necessary to choose the most desirable clamping force and contact area for a given operating condition. If a mechanism includes conical discs and the discs are designed so that the contact area is at an optimum value when the contact region is relatively close to the axis of the planet discs, then it is probable that the area of the contact region will deviate from the optimum value when the contact area is moved toward the periphery of the planet discs. This change is the area of the contact region takes place because of the aforementioned change in the relative curvature of the frictionally engaged discs.

In one particular prior art arrangement, the planet discs are arranged in two axially spaced assemblies, a first assembly being frictionally engagable with the power input discs and a second assembly being frictionally engageable with the ring discs. Both planet disc assemblies are carried on a common carrier shaft, and they move conjointly in a radial direction as the speed ratio changes from one extreme to the other. If the planet discs are formed with a conical shape in the usual fashion, and if the design variables are chosen so that the mechanism operates at the desired capacity at the maximum speed reduction, an excessive relative curvature between the discs of the first planet disc assembly and the power input disc will exist when the torque ratio is decreased. Conversely, the relative curvature between the ring discs and the discs of the other planet disc assembly will be too slight when the torque ratio is decreased.

To overcome this condition, it is sometimes necessary to introduce a relatively complex control mechanism for automatically varying the disc clamping force so that the magnitude of the clamping force will be at an optimum value throughout the entire torque ratio range. An excessive clamping force is undesirable since this unduly increases the disc wear, and the mechanical operating efficiency decreases accordingly. Similarly, a clamping force which is less than that which is necessary to maintain a driving relationship between the power input and power output shafts will result in excessive disc slippage, thereby impairing the over-all performance of the mechanism.

I have overcome these difficulties by appropriately choosing a disc profile for each of the planet disc assemblies that will provide the desired degree of relative curvature between the frictionally engagable discs. This introduces another design variable which becomes an inherent geometric characteristic of the discs, and which will tend to eliminate the need for making automatic adjustments in other variables. This greatly simplifies the control system.

The provision of an improved friction disc drive mechanism of the type above set forth being a principal object of my invention, it is a further object of my invention to provide a disc drive comprising cooperating friction discs wherein the surface profile of one of the discs is nonlinear in form, and wherein the other disc is formed with a rim portion that frictionally engages the surface of the cooperating disc.

It is a further object of my invention to provide a disc drive of the type above set forth wherein one of the discs is formed with a concave surface profile.

It is another object of my invention to provide a disc drive of the type above set forth wherein one of the discs is formed with a convex surface profile.

For the purpose of particularly describing the improvement of my instant invention, reference will be made to the accompanying drawings wherein:

FIGURE 1 shows a cross-sectional assembly view of an infinitely variable disc drive capable of incorporating the improvement of my invention. FIGURE 1 is taken along section line 1—1 of FIGURE 2;

FIGURE 2 is a transverse cross-sectional view of the mechanism of FIGURE 1, and is taken along section line 2—2 of FIGURE 1;

FIGURE 3 is a partial sub-assembly view of one of the planet discs of the mechanism of FIGURES 1 and 2;

FIGURE 4 is a partial sub-assembly view of another planet disc of the mechanism of FIGURES 1 and 2;

FIGURE 5 is a planet disc of conical form. This disc is representative of certain planet discs of known construction;

FIGURE 6 is a partial sub-assembly view of one of the planet discs of the mechanism of FIGURES 1 and 2; and FIGURE 7 is a partial sub-assembly view of one of the planet discs of the mechanism of FIGURES 1 and 2.

Referring first to FIGURE 1, the torque transmitting components of the transmission assembly have been suitably mounted as illustrated within a test fixture or housing. However, these components may readily be housed and journaled within a suitable automotive transmission housing and adapted for installation in an automotive power train.

In FIGURE 1, numeral 10 designates a power input shaft that may be drivably connected to the crankshaft of an internal combustion engine or to some other suitable power source. Numeral 12 designates a power output shaft which may be drivably connected to the traction wheels of a wheeled vehicle.

The housing is generally designated by numeral 14, and it includes a central portion within which the disc assemblies of the transmission mechanism are situated. The left end of housing 14 is provided with an opening 16 within which is situated a bearing retainer 18, said retainer being secured in place by suitable bolts 20. Shaft 10 is journaled within bearing retainer 18 by a suitable ball bearing, not shown.

The right-hand side of housing 14 is provided with an opening 24 within which is situated a bearing retainer 26. Power output shaft 12 extends through retainer 26 and is journaled therein by ball bearing 28.

The right-hand end of power input shaft 10 is journaled within a pilot bearing recess 42 in power output shaft 40. Power input shaft 10 also extends through a central aperture 44 formed in a boss 46. Boss 46 constitutes a part of the housing 14.

Shaft 10 has splined thereto a hub 48 for a friction disc assembly generally identified by reference character 50. Discs 52 of the disc assembly 50 are internally splined to facilitate a positive connection with the hub 48. A clamping ring 54 is slidably positioned on the hub 48, and a reaction ring 56 is keyed to the hub for absorbing the clamping force of the clamping ring 54. The discs 52 are capable of moving axially with respect to the hub 48.

A servo member 58 is carried by shaft 10 and is situated directly adjacent hub 48. Servo member 58 includes a portion extending in a radially outward direction, and it partly defines a servo working chamber 60. A servo piston member 62 is slidably positioned within member 58, and fluid pressure may be distributed to the working chamber 60 through suitable internal passage structure shown in part at 64 to establish a fluid pressure force on piston member 62. The pressure force acting on piston member 62 is transferred to the clamping ring 54 by means of a thrust ring 66.

The shaft 10 is provided with a reduced diameter section upon which is journaled a clutch disc drum generally identified by reference numeral 68. Drum 68 includes a hub 70 which is rotatably supported on shaft 10 by suitable bushings as indicated. Hub 70 is positively splined to shaft 12, as shown at 72.

Drum 68 comprises a radially extending wall 74 and a cylindrical portion 76 is internally splined to facilitate a driving connection with externally splined friction discs 78, the latter forming a multiple friction disc assembly generally identified by reference character 80. The assembly 80 includes a reaction ring 82 that is splined to cylindrical portion 76 and secured in place by a snap ring as indicated. Assembly 80 also includes a clamping ring 84 slidably splined to cylindrical portion 76 of drum 68. A clamping force can be applied to clamping ring 84 by means of an annular thrust member 90 situated adjacent clamping ring 84, and the clamping forces are produced by angularly spaced springs 91.

A plurality of intermediate friction disc assemblies is provided for establishing a driving connection between disc assemblies 50 and 80, and in the preferred embodiment herein disclosed there are five such intermediate disc assemblies. In FIGURE 1, one of these intermediate disc assemblies is identified by reference character 92, and it includes a first group of discs shown at 94 and a second group of discs shown at 96, the discs 94 and 96 being spaced axially along a supporting shaft 98.

The discs 94 and 96 are splined to shaft 98, although a limited degree of axial movement of the discs 94 and 96 with respect to shaft 98 may be accommodated.

Friction discs 96 and the discs 78 of the disc assembly 80 are situated in interdigital relationship to establish a frictional driving connection therebetween. In a similar fashion, the discs 94 are disposed in frictional driving engagement with discs 52 of the disc assembly 50.

It will be apparent from the foregoing that discs 78 and 96 will become drivably engaged whenever fluid pressure is distributed to cylinder 88, and similarly a frictional driving connection will be established between discs 52 and 94 whenever fluid pressure is distributed to working chamber 60.

The radius of contact between discs 52 and 94 will depend upon the radial position of shaft 98, and the driving speed ratio between shaft 10 and discs 94 will become less as the distance between shaft 98 and shaft 10 increases. Also, the radius of contact for the discs 96 and 78 with respect to the axis of shaft 98 will become progressively smaller as the shaft 98 is moved radially outward. It is therefore apparent that the ratio of the speed of driving shaft 10 to the speed of the driven drum 68 will become progressively smaller as shaft 98 is moved radially outward. Conversely, the speed ratio will increase when the shaft 98 is moved radially inward.

The mechanism for providing a radial adjustment of the shaft 98 and the intermediate friction disc assemblies 92 can best be seen by referring to FIGURES 1 and 2. Shown in FIGURE 1 is one of several spindle shafts 100 which are received in openings 102 formed in housing wall 46. The shafts 100 are thereby anchored in a relatively stationary position. A sleeve 104 is received over each shaft 100 and is journaled thereon for rotation about the axis thereof. A gear sector 106 is integrally formed on each of the sleeves 104 at one end thereof.

The sleeves 104 are also provided with arms 108, one arm 108 being situated at each end of sleeve 104. The spaced arms 108 are adapted to support shaft 98, the latter bridging the space between the spaced arms 108 as shown in FIGURE 3. The free ends of spindle shafts 100 are connected to an annular supporting ring 110 as shown in FIGURE 2, and this connection is formed by externally threading the ends of shafts 100 and by securing the ring 110 to the threaded ends of the shafts by nuts 112.

Each of the geared sectors 106 is situated in meshing engagement with a gear 114 journaled for movement on a stationary sleeve 116 that forms a part of wall 46. One of the sleeves 104 is formed with a bell crank arm 118 as indicated in FIGURES 1 and 2, and it extends in a radially outward direction. The outward end of arm 118 is coupled to a movable piston of a fluid pressure operated servo motor 120, a suitable linkage mechanism 122 being provided for this purpose. Control fluid may be admitted to the servo motor 120 through a control pressure passage shown in part at 124. This passage forms a part of an automatic control circuit, not shown or described.

When servo motor 120 is pressurized, bell crank arm 118 will pivot about the axis of the associated shaft 100 in a clockwise direction as viewed in FIGURE 2. This will cause the sleeve 104 and the gear sector 106 to rotate, and the intermediate friction disc assembly 92 associated with sleeve 104 will therefore be moved in a radially outward direction. The center of the pitch circle for the gear sector 106 coincides with the axis of the associated shaft 100, and the rotary motion of gear sector 106 will cause the gear 114 to rotate about the fixed axis of shaft 10. Gear 114 will therefore cause the other gear sectors 106 to rotate about their respective centers, and the intermediate disc assemblies 92 associated with each of these gear sectors will therefore be moved in the same direction as the direction of the movement of the intermediate disc assembly associated with bell crank arm 118. Each of the intermediate disc assemblies may be moved in unison in either a radially outward direction or a radially inward direction, depending upon the direction of the motion of the arm 118. When the intermediate disc assemblies assume the position shown in FIGURE 1, the transmission mechanism is conditioned for high speed operation with a minimum speed reduction ratio.

Referring next to FIGURES 3 and 4, I have illustrated in longitudinal cross-section the intermediate disc assembly 92. One disc of the group 94 is shown in FIGURE 3 and one disc of the group 96 is shown in FIGURE 4. The disc 94 is formed with a concave profile. A radial tangent to the surface of disc 94 at the radially outward region will form a relatively large angle with respect to the axis of shaft 100 when compared to the angle formed by a corresponding tangent located at the radially inward region of the disc 94.

The power input discs 52 are each formed with enlarged rim portions which are characterized by a circular profile. In the embodiment shown, this profile is in the form of a radius and the rounded surface of the rims of discs 52 engage the concave profiles of discs 94.

If one considers the line of action of the discs 52 and discs 94 as a reference line, a relative curvature will exist between the rounded rims of discs 52 and the surfaces of discs 94. I contemplate that a supply of lubricating fluid will be continuously circulated throughout the interior of the transmission housing so that a film of oil will exist between the rims of discs 52 and the convex surface of discs 94 in the region of the contact. Because of the relative curvature between these discs, the effective area of contact over which shear stresses will be developed in the oil film will be elliptical in shape. Since the relative curvature of the rims for discs 52 with respect to the discs 94 will increase as the discs 94 are moved toward the axis of discs 92, the area of this elliptical region of contact will become smaller. This variation is desirable since the torque capacity of the mechanism will increase as the torque ratio is varied from a maximum to a minimum. When the mechanism is so conditioned for maximum torque multiplication, the area of the contact region is also at a maximum. The curvature of discs 94 can be carefully chosen in accordance with the characteristics of the engine with which the mechanism of FIGURES 1 and 2 is to be used, so that the clamping pressure of the discs will always be at an optimum value.

When the mechanism is conditioned for maximum torque multiplication, the discs 96 assume the position shown in FIGURE 4 relative to the ring discs 78. Under these conditions a minimum degree of relative curvature between the rims for discs 78 and the discs 96 is desirable since this will produce a maximum area over which fluid shear stresses can be developed in the region of the contact. Because of this requirement, the profile of discs 96 is made concave in form. As the discs 96 are moved away from the axis of discs 78, the torque ratio of the mechanism decreases, and the torque transmitting requirements of the mechanism correspondingly decrease. It is therefore desirable to provide an increased relative curvature between the rims for discs 78 and discs 96. This requirement is satisfied by the convex profile of discs 96.

The rims for discs 78 can be made in a form similar to the rims for discs 52 when viewed in cross-section. In the particular embodiment shown, the rims for discs 78 define a radius, and the curved surface of the rims engage the convex profile of the discs 96.

In FIGURE 5 I have illustrated, merely for the purpose of background information, a planet disc of conventional conical form. It is apparent from this illustration that the relative curvature between the conical discs of FIGURE 5 and the cooperating friction disc will remain constant as the axes of the discs are moved relative to each other. There is no compensation in such an arrangement for the changing torque requirements; and it is necessary, therefore, to provide a controlling mechanism for varying the clamping pressure between the discs.

My improved construction will result in increased efficiency at the extreme torque ratios. This will result in a decrease in the over-all length of the transmission mechanism since a fewer number of discs can be employed. This is true because each of the discs will be used more efficiently.

Further, the flanged discs can be formed by relatively simple machining methods, and the same is true for the contoured planet discs.

Having thus described a preferred embodiment of my invention, what I claim and desire to secure by United States Letters Patent is:

1. A friction disc drive comprising an assembly of first friction discs, assemblies of second and third friction discs, means for rotatably mounting said first assembly for rotation about a first axis, means for mounting said second and third assemblies for rotation about a second common axis parallel to said first axis, the surfaces of the discs of said first assembly having a contoured, concave profile when viewed in diametrical cross section, the surfaces of the discs of said second assembly having a contoured, convex profile when viewed in diametrical cross section, each of said first discs having a peripheral rim portion, the discs of said first assembly and the discs of said second assembly being situated in alternating, interdigital relationship, a fourth assembly of discs having peripheral rim portions disposed in interdigital relationship with respect to the discs of said third assembly, the rim portions of said second discs being frictionally engageable with the surfaces of the discs of said first assembly, the rim portions of the discs of said fourth assembly being frictionally engageable with the surfaces of the discs of said second assembly, means for applying a clamping pressure to said second assembly whereby a frictional driving relationship is established between said assemblies, and means for adjustably positioning the spacing between said axes to vary the driving speed ratio therebetween.

2. A friction disc drive assembly comprising concentrically related power input and power output shafts, a power input friction disc assembly connected to said power input shaft, a ring disc assembly connected to said power output shaft, the outer peripheries of said power input discs and the inner peripheries of said ring discs being formed with peripheral rims, a planet disc assembly situated between said power input discs and said ring discs, the discs of said planet disc assembly being situated in alternating interdigital relationship with respect to said ring discs and with respect to said power input discs, means for applying a clamping pressure to said power input discs to establish a frictional driving relationship between said planet discs and said power input discs, means for applying a clamping pressure to said ring discs to establish a frictional driving relationship between said planet discs and said ring discs, and means for adjustably positioning said planet disc assembly in a radial direction with respect to the axis of said power input discs and the axis of said ring disc whereby the driving speed ratio between said power input shaft and said power output shaft can be varied, the surfaces of said planet discs being characterized by a nonlinear profile when viewed in diametrical cross section, the rim portions of said power input discs and said ring discs being engageable with the profiles of separate ones of planet discs, the profiles of the planet discs engaging said ring discs having a circumferential curvature at the radially outward extremity thereof that is greater than the corresponding curvature at the radially inward portion thereof and the profiles of the planet discs engaging the power input discs having a circumferential curvature at the radially outward extremity thereof that is less than the corresponding curvature at the radially inward portion thereof.

3. A friction disc drive comprising a power input shaft and a power output shaft disposed in concentric relationship, an assembly of power input discs connected to said power input shaft, an assembly of ring discs connected to said power output shaft, the outer peripheral portions of said power input discs and the inner peripheral portions of said ring discs being formed with rims, a planet disc assembly comprising two groups of friction discs, the first of said groups being disposed in alternating, interdigital relationship with respect to said power input discs and the other of said groups being disposed in alternating, interdigital relationship with respect to said ring discs, the rim portions of said power input discs being engageable with the surfaces of the discs of said first group and the rim portions of said ring discs being engageable with the surfaces of the discs of said other group, separate means for applying a clamping pressure to said power input discs and to said ring discs whereby a driving relationship is established between said power input shaft and said power output shaft, the surfaces of the discs of said first group having a concave profile when viewed in diametrical cross section and the surfaces of the discs of said other group having a convex profile when viewed in diametrical cross section, and means for adjustably positioning said planet disc assembly in a radial direction.

4. A friction disc drive comprising a power input shaft and a power output shaft disposed in concentric relationship, an assembly of power input discs connected to said power input shaft, an assembly of ring discs connected to said power output shaft, the outer peripheral portions of said power input discs and the inner peripheral portions of said ring discs being formed with rims, a planet disc assembly comprising two groups of friction discs, the first of said groups being disposed in alternating, interdigital relationship with respect to said power input discs and the other of said groups being disposed in alternating, interdigital relationship with respect to said ring discs, the rim portions of said power input discs being engageable with the surfaces of the discs of said first group and the rim portions of said ring discs being engageable with the surfaces of the discs of said other group, the rim portions of said power input discs and said ring discs being rounded when viewed in radial cross-section, separate means for applying a clamping pressure to said power input discs and to said ring discs whereby a driving relationship is established between said power input shaft and said power output shaft, the surfaces of the discs of said first group having a concave profile when viewed in diametrical cross section and the surfaces of the discs of said other group having a convex profile when viewed in diametrical cross section, and means for adjustably positioning said planet disc assembly in a radial direction.

References Cited in the file of this patent

UNITED STATES PATENTS

| 443,102 | Meier | Dec. 23, 1890 |
| 486,585 | Meier | Nov. 22, 1892 |
| 2,222,281 | Beier | Nov. 19, 1940 |
| 2,841,019 | Beier | July 1, 1958 |

FOREIGN PATENTS

| 526,503 | Italy | Dec. 14, 1954 |